(12) United States Patent
Kulkarni et al.

(10) Patent No.: US 9,880,603 B1
(45) Date of Patent: Jan. 30, 2018

(54) METHODS AND APPARATUS FOR CLOCK GATING PROCESSING MODULES BASED ON HIERARCHY AND WORKLOAD

(71) Applicant: Juniper Networks, Inc., Sunnyvale, CA (US)

(72) Inventors: Vaishali Kulkarni, San Jose, CA (US); Jeffrey G. Libby, Cupertino, CA (US); David J. Ofelt, Menlo Park, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 627 days.

(21) Appl. No.: 13/799,234

(22) Filed: Mar. 13, 2013

(51) Int. Cl.
*G06F 1/00* (2006.01)
*G06F 1/32* (2006.01)

(52) U.S. Cl.
CPC ..................................... *G06F 1/32* (2013.01)

(58) Field of Classification Search
CPC ...... G06F 1/3203; G06F 1/3287; G06F 1/324; G06F 1/3237; G06F 1/3275; G06F 2209/5022; G06F 9/505; G06F 1/32; G06F 1/3206; G06F 1/26
See application file for complete search history.

(56) References Cited

U.S. PATENT DOCUMENTS

| | | | |
|---|---|---|---|
| 5,557,753 A * | 9/1996 | Suenaga | G06F 13/364 710/107 |
| 7,587,686 B1 | 9/2009 | Schleicher | |
| 2003/0115495 A1 * | 6/2003 | Rawson, III | 713/324 |
| 2003/0225904 A1 * | 12/2003 | Kanno | H04L 67/1008 709/232 |
| 2007/0043964 A1 * | 2/2007 | Lim | G06F 1/3203 713/322 |
| 2008/0028068 A1 * | 1/2008 | Nochta | H04W 28/08 709/224 |
| 2008/0178029 A1 * | 7/2008 | McGrane et al. | 713/324 |
| 2009/0268629 A1 | 10/2009 | Hisamatsu | |
| 2009/0328055 A1 * | 12/2009 | Bose | G06F 1/3203 718/105 |
| 2010/0306779 A1 * | 12/2010 | Yengulalp | G06F 9/5038 718/103 |

(Continued)

OTHER PUBLICATIONS

Clabes, Joachim, et al. "Design and Implementation of the Power5™ Microprocessor." Proceedings of the 41st annual Design Automation Conference. ACM, 2004, pp. 670-672.

(Continued)

*Primary Examiner* — Thomas Lee
*Assistant Examiner* — Zhipeng Wang
(74) *Attorney, Agent, or Firm* — Cooley LLP

(57) ABSTRACT

A dispatch module implemented in at least one of a memory or a processing device is operatively coupled to a first processing module and a second processing module. The first processing module has a priority higher than a priority of the second processing module. The dispatch module includes a workload counter associated with the first processing module to provide an indication of a workload at the first processing module. The dispatch module initiates a clock signal at the second processing module only if the indication of the workload at the first processing module satisfies a criterion. The dispatch module sends a data unit to the second processing module for processing only if the indication of the workload at the first processing module satisfies a criterion.

21 Claims, 3 Drawing Sheets

(56) References Cited

U.S. PATENT DOCUMENTS

| | | | | |
|---|---|---|---|---|
| 2011/0088041 A1* | 4/2011 | Alameldeen | ............ | G06F 9/505 |
| | | | | 718/105 |
| 2011/0252254 A1* | 10/2011 | Kameda | ................ | G06F 9/5088 |
| | | | | 713/320 |
| 2011/0252258 A1* | 10/2011 | Im | ......................... | G06F 1/3203 |
| | | | | 713/323 |
| 2012/0166842 A1* | 6/2012 | Sur | ......................... | G06F 1/206 |
| | | | | 713/323 |
| 2013/0185725 A1* | 7/2013 | Abdalla | .................. | G06F 9/505 |
| | | | | 718/102 |
| 2013/0196709 A1* | 8/2013 | Nho | ......................... | G06F 1/324 |
| | | | | 455/550.1 |

OTHER PUBLICATIONS

Mohamood, Fayez, et al. "Noise-Direct: A Technique for Power Supply Noise Aware Floorplanning Using Microarchitecture Profiling." Proceedings of the 2007 Asia and South Pacific Design Automation Conference. IEEE Computer Society, 2007, 6 pages.

\* cited by examiner

| Database 260 | |
|---|---|
| 265 | 270 |
| 1 | ON |
|  | 3 |
|  | 4 |
| 2 | OFF |
|  | 0 |
|  | 4 |

FIG. 3

| Database 260 | |
|---|---|
| 265 | 270 |
| 1 | ON |
|  | 4 |
|  | 4 |
| 2 | ON |
|  | 0 |
|  | 4 |

FIG. 4

METHODS AND APPARATUS FOR CLOCK GATING PROCESSING MODULES BASED ON HIERARCHY AND WORKLOAD

BACKGROUND

Some embodiments described herein relate generally to clock gating. More particularly, some embodiments described herein relate to systems and methods for dynamic coarse clock-gating packet-processing engines for power saving in a device.

Clock gating can be used to deactivate or "turn off" parts of a circuit to reduce the power consumption of a device. A clock signal passes through a logic circuit that can selectively block, or gate, the clock signal. When the clock signal is blocked, logic driven by the gated clock signal suspends operation and does not consume any power. The amount of power savings is related to the amount of logic that is effectively turned off. For example, higher gating on the clock tree (i.e., the clock distribution network) can result in turning off a relatively larger portion of the clock distribution network, thereby using a relatively lower amount of power than would otherwise be used. If the clock is gated at the flip-flop level (for example, immediately before the clock input to a register), very little power is saved because nearly the whole clock network still toggles (e.g., turns on and off).

Some known devices include a two-dimensional array (fabric) or a pool of many relatively small logic elements (referred to herein as packet-processor elements or packet-processing engines (PPEs)). In some instances, a method for clock gating PPEs of a device (such as an application specific integrated circuit (ASIC)) includes monitoring the rate and trend (e.g., increasing or decreasing) of traffic (i.e., workload) experienced at or on an interface. In such instances, the device can include or implement a clock gating method based on the rate and trend of the traffic experienced by the entire device, thereby saving a measure of an amount of power. Because the clock gating is based on the rate of traffic of the entire device, however, in some instances, one or more PPEs can remain powered on even though they are not immediately needed, thereby using power.

Thus, a need exists for improved systems and methods of dynamic coarse clock-gating packet-processing engines for power saving in a device.

SUMMARY

Methods and apparatus for clock gating processing modules in devices are described herein. In some embodiments, a dispatch module implemented in at least one of a memory or a processing device is operatively coupled to a first processing module and a second processing module. The first processing module has a priority higher than a priority of the second processing module. The dispatch module includes a workload counter associated with the first processing module to provide an indication of a workload at the first processing module. The dispatch module initiates a clock signal at the second processing module only if the indication of the workload at the first processing module satisfies a criterion. The dispatch module sends a data unit to the second processing module for processing only if the indication of the workload at the first processing module satisfies a criterion.

BRIEF DESCRIPTION OF THE DRAWINGS

FIG. 3 is a schematic illustration of a portion of a database at a first time, according to an embodiment.

FIG. 4 is a schematic illustration of the portion of the database of FIG. 3, at a second time.

DETAILED DESCRIPTION

Figure 1:
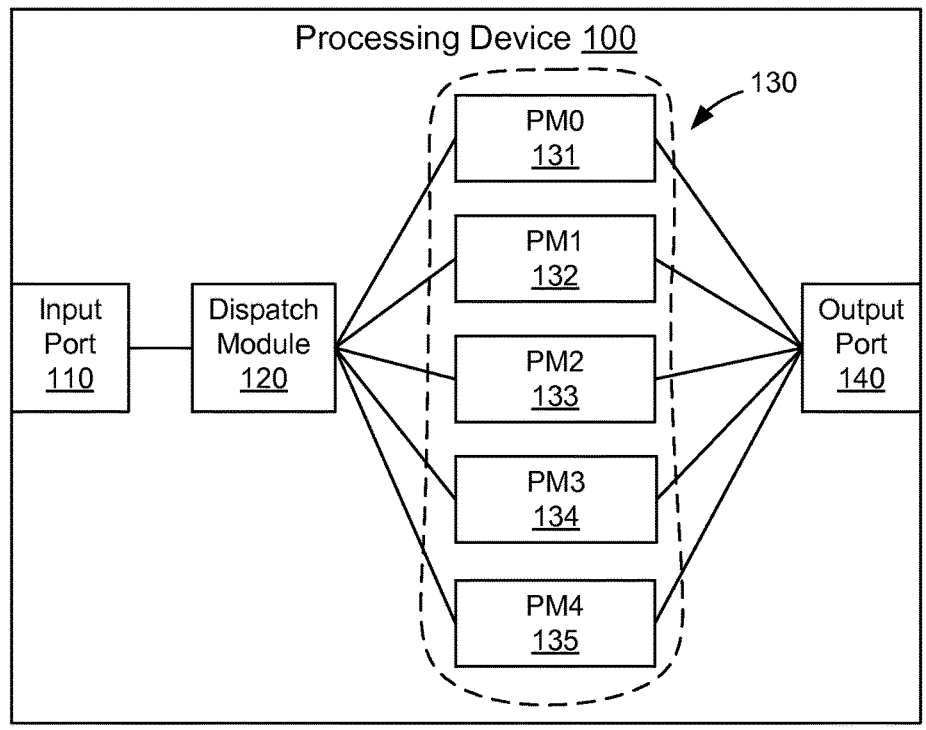
FIG. 1 is a schematic illustration of a processing device according to an embodiment.

In some embodiments, a dispatch module implemented in at least one of a memory or a processing device is operatively coupled to a first processing module and a second processing module. The first processing module has a priority higher than a priority of the second processing module. The dispatch module includes a workload counter associated with the first processing module to provide an indication of a workload at the first processing module. The dispatch module initiates a clock signal at the second processing module only if the indication of the workload at the first processing module satisfies a criterion. The dispatch module sends a data unit to the second processing module for processing only if the indication of the workload at the first processing module satisfies a criterion.

In some embodiments, a non-transitory processor readable medium storing code representing instructions to be executed by a processor can include code to cause a processor to initiate, at a first time, a clock signal of a first processing module in response to receiving a data unit and based on a data unit counter associated with a second processing module satisfying a first workload criterion at the first time. The second processing module has a priority higher than a priority of the first processing module. The code including instructions to cause the processor to modify a data unit counter associated with the first processing module based on sending the data unit to the first processing module. At the processor, the data unit counter associated with the first processing module is modified based on an indication that the first processing module has completed processing the data unit. The code including instructions to cause the processor to terminate, at a second time after the first time, the clock signal of the first processing module based on (1) the data unit counter associated with the first processing unit satisfying a second workload criterion in response to modifying the data unit counter associated with the first processing module based on the indication and (2) the data unit counter associated with the second processing unit not satisfying the first workload criterion at the second time.

In some embodiments, a processing device includes more than one processing modules. Each processing module is in a hierarchy with respect to the remaining process modules. A dispatch module is operatively coupled to each processing module. The dispatch module has a workload counter associated with each processing module. The dispatch module is configured to initiate a clock signal at a processing module only if a value of the workload counter for each processing module that is above the processing module in the hierarchy satisfies a workload criterion. The dispatch module sends a data unit to the processing module such that the processing module processes the data unit only if the value of the workload counter for each processing module that is above the processing module in the hierarchy satisfies the workload criterion.

In some embodiments, a device, such as an application specific integrated circuit (ASIC), can include a set of processing modules configured to perform one or more processes on data units. The set of processing modules can be arranged in a hierarchical manner. The device can include a workload monitor module that monitors the workload of each processing module from the set of processing modules. A dispatch module can provide a clock signal to a first processing module from the set of processing modules. The dispatch module can provide data units to the first processing module to be processed until the first processing module reaches a processing limit. After the first processing module reaches its processing limit, the device can provide a clock signal to a second processing module, which is the next processing module in the hierarchy. The device can then provide data units to the second processing module as long as the first processing module remains at its processing limit. If the first processing module moves below its processing limit and can handle the entire processing for the device, the dispatch module can suspend the clock signal to the second processing module after the second processing module finishes processing any already allocated data units. Thus, the hierarchy provides a way to provide a clock signal to an additional processing module only when the processing module above the additional processing module in the hierarchy is at capacity. This minimizes the number of processing devices in the active state (e.g., to which clock signals are provided) and, thus, decreases the power consumption of the device.

In some embodiments, the processing modules used in such a clock gating scheme can perform one or more processes on a data unit. For example, some embodiments can perform a classification process, a forwarding process, or an inspection process of a data unit. Expanding further, some of the embodiments described herein can perform a deep packet inspection of a data unit prior to forwarding. In the context of the Open Systems Interconnection (OSI) model, a deep packet inspection occurs when an electronic communication device (or portion thereof such as, for example, an application-specific integrated circuit (ASIC)) inspects a data packet at or above the third layer (e.g., the network layer). In some instances, deep packet inspection of a data packet can include inspection of all seven layers (e.g., the physical layer, the data link layer, the network layer, the transport layer, the session layer, the presentation layer, and the application layer).

Deep packet inspection can be used, for example, to search for protocol non-compliance, viruses, spam, worms, buffer overflow attacks, denial-of-service (DoS) attacks, and/or the like. Moreover, an inspected data packet can be, for example, redirected, flagged, blocked, rate limited, and/or reported to a reporting agent in a network. Thus, HTTP errors of different classifications may be identified and forwarded for analysis. In some instances, some of the embodiments described herein can identify packet flows (rather than packet-by-packet analysis), allowing control actions based on accumulated flow information. In some instances, some of the embodiments described herein can be used by, for example, an internet service provider (ISP) to perform deep pack inspection for lawful interception, policy definition and enforcement, targeted advertising, quality of service (QoS), copyright enforcement, and/or the like.

As used in this specification, a "data unit" refers to any suitable portion of data. For example, data unit can refer to a data packet, a data cell, or a data frame such as, information that is delivered as a unit among peer entities of a network and that may contain control information, such as address information, or user data.

As used herein, a module can be, for example, any assembly and/or set of operatively-coupled electrical components, and can include, for example, a memory, a processor, electrical traces, optical connectors, software (executing in hardware), and/or the like.

As used herein, the singular forms "a," "an" and "the" include plural referents unless the context clearly dictates otherwise. Thus, for example, the term "module" is intended to mean a single module or multiple modules.

FIG. 1 is a schematic illustration of a processing device 100 according to an embodiment. The processing device 100 can be, for example, an application specific integrated circuit (ASIC), a programmable logic device (PLD), a field-programmable gate array (FPGA), or any other suitable processing device. In some embodiments, the processing device 100 can be included in, for example, a core router, an edge router, a switch fabric, and/or any other suitable device. The processing device 100 includes at least an input port 110, a dispatch module 120, a set of processing modules 130, and an output port 140. The input port 110 can be any suitable port or connection (e.g., a soldered connection such as a ball grid array (BGA), a socket connection such as a land grid array (LGA), or the like) that enables the processing device 100 to receive a data unit (e.g., a data packet). Similarly, the output port 140 can be any suitable port or connection that enables the processing device 100 to send (e.g., forward) a data unit.

As shown in FIG. 1, the dispatch module 120 can be, for example, a hardware module included in the processing device 100. In some embodiments, the dispatch module 120 can be a software module included in, for example, a memory (not shown in FIG. 1) and executed in the processing device 100. As shown, the dispatch module 120 is operatively coupled to the input port 110 and the processing modules 130. The dispatch module 120 can execute a set of instructions associated with clock gating one or more processing modules included in the set of processing modules 130. Expanding further, the dispatch module 120 can execute a set of instructions associated with minimizing a number of processing modules that are active (e.g., receiving a clock signal) for a given workload. For example, in some instances, the dispatch module 120 can increment or decrement an indicator (e.g., a counter) associated with a processing module included in the set of processing modules 130 based on a workload of that processing module and can clock gate one or more other processing modules in the set of processing modules 130 based at least in part on the indicator associated with that processing module. For example, the dispatch module 120 can clock gate a processing module when the indicator associated with that processing module satisfies a workload criterion, as described in further detail herein. In some instances, the dispatch module 120 can clock gate a processing module based on an indicator associated with another processing module (e.g., a processing module having a higher priority) included in the set of processing modules 130, as described in further detail herein.

The set of processing modules 130 (also referred to herein as "processing modules" 130) can be, for example, one or more hardware modules included in the processing device 100. For example, in some instances, the processing modules 130 can be packet-processing engines configured to perform a common function. Expanding further, the processing modules 130 can have any suitable architecture (e.g., transistors, gates, or other active device(s)) that enable the processing modules 130 to perform a process (e.g., execute a process based on a set of instructions) on a data unit using, for example, first-in-first-out (FIFO) methodology. For example, the processing modules 130 can each be configured to perform a classification of a data unit, a forwarding of the data unit, a deep packet inspection of the data unit, and/or the like.

As shown in FIG. 1, the set of processing modules 130 includes a first processing module 131, a second processing module 132, a third processing module 133, a fourth processing module 134, and a fifth processing module 135. Although shown as including five processing modules, in other embodiments, the processing device 100 can include more than five processing modules. In still other embodiments, the processing device 100 can include less than five processing modules (e.g., two, three, or four processing modules). Moreover, the processing modules 130 can be part of a pool of processing modules, an array of processing modules and/or the like.

The processing device 100 can be arranged or configured such that each successive processing module is associated with a lower priority value than a priority value of the previous module. For example, the set of processing modules 130 is such that the first processing module 131 is associated with a first priority value (e.g., a highest priority value). The second processing module 132 is associated with a second priority value that is lower the first priority value. The third processing module 133 is associated with a third priority value that is less than the second priority value. The fourth processing module 134 is associated with a fourth priority value that is less than the third priority value. The fifth processing module 135 is associated with a fifth priority value that is less than the fourth priority value (i.e., a lowest priority level). In this manner, the dispatch module 120 can send a data unit to a processing module having the highest priority while an indicator (e.g., a workload counter) associated with the processing module does not satisfy a criterion (e.g., a workload threshold). Similarly stated, the dispatch module 120 can send a data unit to a processing module having the highest priority only if the workload of the processing module is below a workload threshold, as described in further detail herein.

Figure 2:
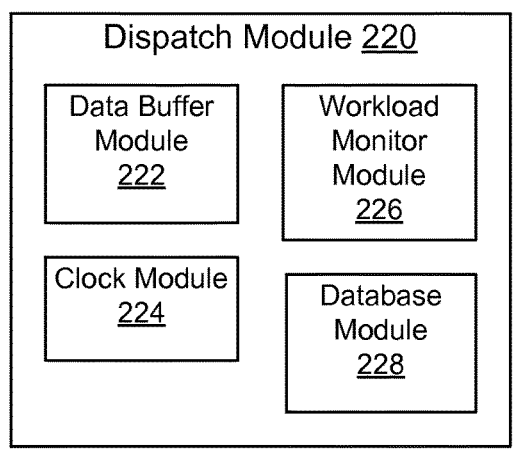
FIG. 2 is a schematic illustration of a dispatch module according to an embodiment.

FIG. 2 is a schematic illustration of a dispatch module 220 according to an embodiment. In some instances, the dispatch module 220 can be included in, for example, the processing device 100 (e.g., the dispatch module 220 can be similar to or the same as the dispatch module 120). The dispatch module 220 can be configured to execute a set of instructions associated with clock gating one or more processing modules included in a processing device. More specifically, the dispatch module 220 can include a data buffer module 222, a clock module 224, a workload monitor module 226, and a database module 228.

The data buffer module 222 can be configured to buffer and/or at least temporarily store a set of data packets. For example, in some instances, the data buffer module 222 can be configured to store a set of data packets, received at an input port (e.g., the input port 110 shown in FIG. 1), such that the dispatch module 220 can send a data packet from the data buffer module 222 to a processing module. Expanding further, in some instances, the database module 228 can send to the data buffer module 222 a signal associated with an identification of a processing module having a highest priority and not satisfying a workload criterion (e.g., having a workload counter value below a workload threshold). In this manner and in response to the signal, the data buffer module 222 can send (e.g., forward) the data packet to the identified processing module, as described in further detail herein.

The clock module 224 can be configured to send a clock signal to a processing module associated with "turning on" or "turning off" the processing module in response to a signal received from the workload monitor module 226, as discussed below. For example, in some instances, the clock module 224 can send a clock signal (e.g., operative in turning on or powering on a processing module) to a first processing module when an indicator associated with a second processing module satisfies a criterion and there is a data unit or data packet available for dispatch (e.g., buffered at or temporarily stored in the data buffer module 222). In some instances, the clock module 224 can terminate the clock signal if the indicator associated with the second processing module no longer satisfies the criterion (e.g., a counter associated with the second processing module falls below a workload threshold value). In this manner, the clock module 224 can dynamically clock gate one or more processing modules included in a processing device to reduce the power consumption of the processing device.

The workload monitor module 226 can be configured to monitor a workload counter associated with a processing module (e.g., any or all of the processing modules included in the set of processing modules 130 shown in FIG. 1). For example, in some instances, the workload module 226 can send a signal to the database module 228 when a workload counter associated with a processing module satisfies a criterion (e.g., reaches a workload threshold value). In this manner, the database module 228 can update a database with a current state (e.g., power state, workload counter, etc.) of a processing module based on a signal received from the workload module 226, as described in further detail herein. In some embodiments, the workload monitor module 226 includes and/or implements such counters. In other embodiments, the counters are within a counter module (not shown) within the processing device including the dispatch module 220 (e.g., processing device 100 of FIG. 1). In such embodiments, the workload monitor module 226 can communicate with the counter module regarding the counters.

The database module 228 can be configured to query and/or update a database (e.g., a table or the like within the database module 228 or operatively coupled to the database module 228) and to send a signal to the clock module 224 when a workload counter within the database associated with a processing module reaches a workload criterion. In this manner and in response to the signal, the clock module 224 can send a clock signal (e.g., operative in turning on or powering on a processing module) to a processing module having a lower priority when the buffer module 222 indicates there is a data unit available for processing, as described above. In some embodiments, the database module 228 can be operably coupled to the database (e.g., included within the dispatch module 220). In other embodiments, the database module 228 can include the database (e.g., a hardware module containing at least a memory). For example, in some embodiments, the database module 228 can include a database 260, as shown at a first time in FIG. 3 and at a second time in FIG. 4.

The database 260 can be any suitable database or table configured to store information associated with a set of processing modules (e.g., the processing module 130 shown in FIG. 1). For example, as shown in FIG. 3, the database 260 includes a first column 265 configured to store an indication associated with each processing module included in a set of processing modules and a second column 270 configured to store information associated with the corresponding processing module. Expanding further, the database 260 can store information associated with a first processing module "1" (e.g., the first processing module 131 described with reference to FIG. 1) and a second processing module "2" (e.g., the second processing module 132 described abode with reference to FIG. 1). The database 260 can be arranged in a hierarchical order such that the first processing module "1" has a priority value that is higher than a priority value of the second processing module "2" and this higher priority value is reflected in the structure of database 260 (e.g., order of data within database 260).

The second column 270 can store a power status, a workload counter value, a counter threshold value (e.g., a workload criterion as described above), and/or the like. For example, at the first time (shown in FIG. 3), the second column 270 can store an indication associated with the first processing module "1" being in an "ON" state and having a workload counter "3" and a workload criterion "4". The second column can also store an indication associated with the second processing module "2" being in an "OFF" state and having a workload counter "0" and a workload criterion "4".

In use, the database module 228 can update the database 260 when the database module 228 receives a signal from the workload monitor module 226 associated with a change of state (e.g., a power state and/or an increase in a workload counter) of a processing module. For example, at the second time (shown in FIG. 4) after the first time, a data unit (e.g., a data packet) can be sent to the first processing module "1". In this manner, the workload monitor module 226 can receive a signal from the first processing module "1" to increment the workload counter associated with the first processing module "1". The workload monitor module 226 can, in turn, send a signal to the database module 228 such that, upon receiving the signal, the database module 228 increments the value of the workload counter within the database 260. For example, as shown in FIG. 4, the database module 228 increments the workload counter "3" within the database 260 to an updated value of "4", at the second time.

After the workload counter is incremented within the database 260 and in response to the workload criterion being satisfied, the database module 228 can send a signal to the clock module 224 associated with an indication that the workload criterion of the first processing module "1" is satisfied. In this manner, the clock module 224 can receive a signal from the buffer module 222 associated with a data unit available for processing and in response to receiving the signal from the buffer module 222 and the database module 228, the clock module 224 can initiate a clock signal at the second processing module "2" (e.g., turns on or powers on the second processing module "2"). Accordingly, the database module 228 can update the database 260 such that the second processing module "2" is updated from an "OFF" state (FIG. 3) to an "ON" state (FIG. 4). In this manner, the buffer module 222 can send a second data unit to the second processing module "2" based at least in part on the workload criterion of the first processing module "1" being satisfied and with the second processing module "2" being in the "ON" state.

In some instances, at a third time after the second time, the workload monitor module 226 can receive a signal from the first processing module "1" associated with a completion of a processing (e.g., a classifying, an inspection, and/or a forwarding) of a data unit. In such instances, the workload monitor module 226 can send a signal to the database module 228 such that, upon receiving the signal, the database module 228 decrements the value of the workload counter associated with the first processing module and within database 260. After the workload counter is decremented within the database 260 and in response to the workload criterion no longer being satisfied, the database module 228 can send a signal to the clock module 224 associated with an indication that the workload criterion of the first processing module "1" is not satisfied. In this manner, the clock module 224 can terminate the clock signal associated with the second processing module "2" (e.g., turns off or powers off the second processing module "2"). In this manner, the dispatch module 220 can send a data packet to a first processing module having the highest priority value while the workload criterion of the processing module is not satisfied. Moreover, the dispatch module 220 can turn off or power off (e.g., terminate a clock signal) a second processing module having a lower priority while the workload criterion of the first processing module is not satisfied.

Figure 5:
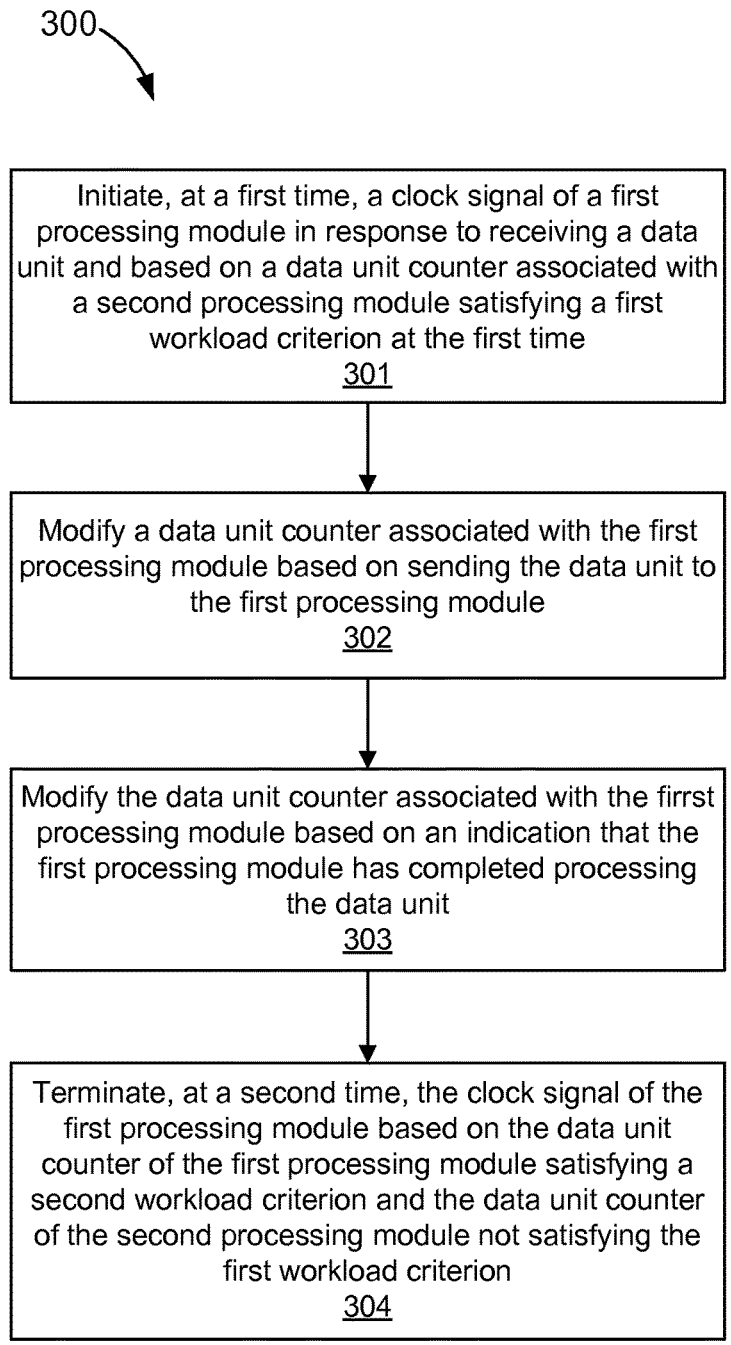
FIG. 5 is a flow chart illustrating a method of clock gating according to an embodiment.

FIG. 5 is a flowchart illustrating a method of clock gating one or more processing modules, according to an embodiment. A method 300 includes initiating, at a first time, a clock signal of a first processing module in response to receiving a data unit and based on a data unit counter associated with a second processing module satisfying a first workload criterion at the first time, at 301. The first processing module and the second processing module can be included in, for example, a processing device such as an application-specific integrated circuit (ASIC). The processing modules can be configured such that the second processing module has a higher priority value than a priority value of the second processing module. In some embodiments, a clock module such as, for example, the clock module 224 described above with reference to FIG. 2 can initiate the clock signal of the first processing module. In some embodiments, the first workload criterion is associated with a workload counter of the second processing module. For example, the first workload criterion can be a workload threshold such that when the workload counter associated with the second processing module reaches the workload threshold, the first workload criterion is satisfied.

At 302, a data unit counter associated with the first processing module is modified based on sending the data unit to the first processing module. For example, the data unit counter (i.e., a workload counter associated with the first processing module) is incremented when the data unit is sent to the first processing module. At 303, the data unit counter associated with the first processing module is modified based on an indication that the first processing module has completed processing the data unit. For example, the data unit counter associated with the first processing module is decremented when the first processing module completes processing the data unit. At a second time, the clock signal of the first processing module is terminated based on the data unit counter of the first processing module satisfying a second workload criterion and the data unit counter of the second processing module not satisfying the first workload criterion, at 304. For example, the second workload criterion can be associated with a minimum value of the data counter (e.g., zero) associated with the first processing module, and the first workload criterion is the workload threshold (e.g., a maximum value) associated with the second processing module, as described above. Thus, when the first processing module can be clock gated when the first processing module is idle (e.g., not processing a data unit) and when the second processing module is below a workload threshold, thereby reducing power consumption of a processing device.

Although the method 300 is described above as being implemented using a first processing module and a second processing module, the method 300 can be implemented on a processing device including any suitable number of processing modules. For example, in some embodiments, the method 300 can be implemented in or on the processing device 100, described above with reference to FIG. 1. In such instances, the method 300 can be implemented on any successive processing modules included in the set of processing module 130. For example, in some instances, the workload criterion of the first processing module 131, the second processing module 132, and the third processing module 133 can be satisfied and a clock signal can be initiated at the fourth processing module 134. When the processing of the data units is completed by the fourth processing module 134, the third processing module 133, and the second processing module 132, the clock signals associated therewith can be terminated. Thus, the processing device 100 can dynamically clock gate the set of processing modules 130 based on a workload counter associated with each individual processing module such that a data unit is sent to a processing module with the highest priority that has not satisfied a workload criterion.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals (e.g., propagating electromagnetic wave carrying information on a transmission medium such as space or a cable). The media and computer code (also referred to herein as code) may be those designed and constructed for the specific purpose or purposes. Examples of non-transitory computer-readable media include, but are not limited to: magnetic storage media such as hard disks, optical storage media such as Compact Disc/Digital Video Discs (CD/DVDs), Compact Disc-Read Only Memories (CD-ROMs), magneto-optical storage media such as optical disks, carrier wave signal processing modules, and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.), or other programming languages and/or other development tools. Additional examples of computer code include, but are not limited to, control signals, encrypted code, and compressed code.

While various embodiments have been described above, it should be understood that they have been presented by way of example only, and not limitation, and as such, various changes in form and/or detail may be made. Any portion of the apparatus and/or methods described herein may be combined in any suitable combination, unless explicitly expressed otherwise. Where methods and/or schematics described above indicate certain events and/or flow patterns occurring in certain order, the ordering of certain events and/or flow patterns may be modified. Additionally certain events may be performed concurrently in parallel processes when possible, as well as performed sequentially.

What is claimed:

1. An apparatus, comprising:
a processor configured to receive and at least temporarily store data units, the processor including a plurality of processing engines, each processing engine from the plurality of processing engines being in a priority hierarchy with respect to the remaining processing engines from the plurality of processing engines based on an order of an identifier for each processing engine from the plurality of processing engines, a first processing engine from the plurality of processing engines having a priority higher than a priority of a second processing engine that is from the plurality of processing engines and that has a priority higher than a priority of the remaining processing engines from the plurality of processing engines,
the processor including a data unit counter (1) associated with the first processing engine and (2) configured to provide an indication of a number of data units being processed at the first processing engine,
the processor configured to initiate a clock signal at the second processing engine only if the indication of the number of data units being processed at the first processing engine exceeds a threshold number of data units and at least one data unit is stored by the processor, the processor configured to send a data unit to the second processing engine for processing only if the indication of the number of data units being processed at the first processing engine exceeds the threshold number of data units and at least one data unit is stored by the processor, the processor configured to gate the clock signal at the second processing engine in response to the indication of the number of data units being processed at the first processing engine falling below the threshold number of data units.

2. The apparatus of claim 1, wherein the processor includes a data unit counter (1) associated with the second processing engine and (2) configured to provide an indication of a number of data units being processed at the second processing engine, the processor configured to terminate the clock signal at the second processing engine if the data unit counter associated with the second processing engine indicates that the second processing engine is in an idle state.

3. The apparatus of claim 1, wherein the threshold number of data units is a first threshold number of data units, the plurality of processing engines including a third processing engine, the priority of the second processing engine being higher than a priority of the third processing engine, the processor including a data unit counter (1) associated with the second processing engine and (2) configured to provide an indication of a number of data units being processed at the second processing engine,
the processor configured to initiate a clock signal at the third processing engine only if the indication of the number of data units being processed at the first processing engine has reached the first threshold number of data units, the indication of the number of data units being processed at the second processing engine exceeds a second threshold number of data units, and at least one data unit is stored by the processor.

4. The apparatus of claim 1, wherein the priority of the first processing engine is higher than the priority of the second processing engine based on the identifier of the first processing engine being less than the identifier of the second processing engine.

5. The apparatus of claim 1, wherein the processor is within an application specific integrated circuit (ASIC) including the plurality of processing engines.

6. The apparatus of claim 1, wherein the first processing engine is configured to perform a function on a first data unit, the second processing engine is configured to perform the function on a second data unit.

7. The apparatus of claim 1, wherein the processor is configured to send a data unit to the first processing engine such that the first processing engine performs at least one of classification of the data unit, forwarding of the data unit, or deep packet inspection of the data unit.

8. The apparatus of claim 1, wherein the processor is configured to be implemented at an edge switch of a network.

9. The apparatus of claim 1, wherein the processor is configured to receive a signal from the first processing engine in response to the first processing engine completing processing of a data unit, the processor configured to modify a value of the data unit counter in response to receiving the signal.

10. A non-transitory processor-readable medium storing code representing instructions to be executed by a processor, the code comprising code to cause the processor to:
    initiate, at a first time, a clock signal of a first processing engine from a plurality of processing engines included in the processor in response to receiving a data unit and based on a data unit counter associated with a second processing engine from the plurality of processing engines satisfying a first workload criterion at the first time and a data unit being available for processing, the first workload criterion being based on a threshold number of data units to be processed at the second processing engine, each processing engine from the plurality of processing engines being in a priority hierarchy with respect to the remaining processing engines from the plurality of processing engines based on an order of an identifier for each processing engine from the plurality of processing engines, the second processing engine having a priority higher than a priority of the first processing engine, the first processing engine having a priority higher than the remaining processing engines from the plurality of processing engines;
    modify a data unit counter associated with the first processing engine based on sending the data unit to the first processing engine;
    modify the data unit counter associated with the first processing engine based on an indication that the first processing engine has completed processing the data unit; and
    terminate, at a second time after the first time, the clock signal of the first processing engine based on (1) the data unit counter associated with the first processing engine satisfying a second workload criterion in response to modifying the data unit counter associated with the first processing engine based on the indication, and (2) the data unit counter associated with the second processing engine not satisfying the first workload criterion at the second time, the second workload criterion based on the first processing engine being in an idle state.

11. The non-transitory processor-readable medium of claim 10, wherein data associated with the plurality of processing engines is stored in a hierarchical database, data associated with the first processing engine being stored in the database at a location having a priority value less than a priority value associated with a location in the database storing data associated with the second processing engine.

12. The non-transitory processor-readable medium of claim 10, wherein the processor is within an application specific integrated circuit (ASIC).

13. The non-transitory processor-readable medium of claim 10, further comprising code to cause the processor to:
    provide a clock signal to the second processing engine when the data unit counter associated with the second processing engine does not satisfy the first workload criterion.

14. An apparatus, comprising:
    a processor configured to receive and at least temporarily store data units, the processor including a plurality of processing engines, the plurality of processing engines including more than two processing engines, each processing engine from the plurality of processing engines being in a priority hierarchy with respect to the remaining processing engines from the plurality of processing engines based on an order of an identifier for each processing engine from the plurality of processing engines,
    the processor having a data unit counter for each processing engine from the plurality of processing engines, the processor configured to initiate a clock signal at a processing engine from the plurality of processing engines only if a value of the data unit counter for each processing engine from the plurality of processing engines that is above the processing engine in the priority hierarchy satisfies a workload criterion and at least one data unit is stored by the processor, the workload criterion being based on a threshold number of data units processed at each processing engine from the plurality of processing engines,
    the processor configured to send a data unit to the processing engine such that the processing engine processes the data unit only if the value of the data unit counter for each processing engine from the plurality of processing engines that is above the processing engine in the priority hierarchy satisfies the workload criterion, the processor configured to gate the clock signal at the processing engine if the value of a data unit counter for a higher priority processing engine from the plurality of processing engines does not satisfy the workload criterion.

15. The apparatus of claim 14, wherein the processor is configured to terminate the clock signal at the processing engine from the plurality of processing engines if the value of the data unit counter for the processing engine indicates that the processing engine is in an idle state.

16. The apparatus of claim 14, wherein the processor is within an application specific integrated circuit (ASIC).

17. The apparatus of claim 14, wherein each processing engine from the plurality of processing engines is configured to perform a common function.

18. The apparatus of claim 14, wherein the processor is configured to be implemented at an edge switch of a network.

19. The apparatus of claim 14, wherein each processing engine from the plurality of processing engines is configured to perform at least one of classification of a data unit, forwarding of a data unit, or deep packet inspection of a data unit.

20. The apparatus of claim 14, wherein the data unit counter for each processing engine from the plurality of processing engines is configured to provide an indication of a number of data units being processed at that processing engine from the plurality of processing engines.

21. The apparatus of claim 1, wherein each processing engine from the plurality of processing engines is one of a single processing engine or a pool of processing engines.

* * * * *